(12) United States Patent
Lin

(10) Patent No.: US 9,780,977 B2
(45) Date of Patent: Oct. 3, 2017

(54) CLOCK CORRECTION METHOD AND CIRCUIT UTILIZING TRAINING SEQUENCE TO CORRECT OSCILLATOR OUTPUT, AND REFERENCE CLOCK GENERATION METHOD AND CIRCUIT UTILIZING TRAINING SEQUENCE TO GENERATE REFERENCE CLOCK

(71) Applicant: Silicon Motion Inc., Hsinchu County (TW)

(72) Inventor: Yain-Reu Lin, Kaohsiung (TW)

(73) Assignee: Silicon Motion Inc., Hsinchu County (TW)

( * ) Notice: Subject to any disclaimer, the term of this patent is extended or adjusted under 35 U.S.C. 154(b) by 0 days.

(21) Appl. No.: 15/289,929

(22) Filed: Oct. 10, 2016

(65) Prior Publication Data

US 2017/0111194 A1     Apr. 20, 2017

(30) Foreign Application Priority Data

Oct. 14, 2015   (TW) .............. 104133654 A

(51) Int. Cl.
*H04L 7/033* (2006.01)
*H04L 27/01* (2006.01)
*H04L 1/24* (2006.01)

(52) U.S. Cl.
CPC .............. *H04L 27/01* (2013.01); *H04L 1/242* (2013.01); *H04L 7/033* (2013.01)

(58) Field of Classification Search
CPC ... H04L 7/00; H04L 7/02; H04L 7/033; H04L 7/04; H04L 7/041; H04L 7/06; H04L 27/2655; H04L 1/7073; H04L 25/4904; H04B 1/7156; H03L 7/06

USPC ....... 375/316, 354, 356, 359, 360, 361, 363, 375/364, 365, 366, 368, 373, 374, 375, 375/376

See application file for complete search history.

(56) References Cited

U.S. PATENT DOCUMENTS

| 9,128,643 B2* | 9/2015 | Lin ............................ G06F 1/12 |
| 2007/0079166 A1 | 4/2007 | Okada |
| 2008/0145065 A1* | 6/2008 | Kawamura ............. H04J 3/073 398/182 |
| 2008/0298532 A1* | 12/2008 | Wang ........................ H03L 7/07 375/376 |
| 2009/0052600 A1* | 2/2009 | Chen ....................... H04L 25/14 375/359 |
| 2014/0169507 A1* | 6/2014 | Shimada ................. H03M 5/12 375/342 |

FOREIGN PATENT DOCUMENTS

TW           201348919 A    12/2013
TW           I445315 B       7/2014

* cited by examiner

*Primary Examiner* — Siu Lee

(74) *Attorney, Agent, or Firm* — Winston Hsu

(57) ABSTRACT

A clock correction method is provided. The clock correction method includes the following steps: receiving an equalization training sequence specified by a communication protocol, wherein the equalization training sequence includes a specific pattern occurring repeatedly; performing frequency division on the equalization training sequence according to a number of toggles of the specific pattern so as to generate an equalization training sequence clock; and correcting a frequency of an output clock of an oscillator according to the equalization training sequence clock.

11 Claims, 6 Drawing Sheets

CLOCK CORRECTION METHOD AND CIRCUIT UTILIZING TRAINING SEQUENCE TO CORRECT OSCILLATOR OUTPUT, AND REFERENCE CLOCK GENERATION METHOD AND CIRCUIT UTILIZING TRAINING SEQUENCE TO GENERATE REFERENCE CLOCK

BACKGROUND OF THE INVENTION

1. Field of the Invention

The disclosed embodiments of the present invention relate to clock correction, and more particularly, to a clock correction method utilizing a training sequence used for communication link training to correct a frequency of an output clock of an oscillator, and related method for generating a reference clock, clock correction circuit and circuit for generating a reference clock.

2. Description of the Prior Art

A conventional universal serial bus (USB) 3.0 system has to use an external quartz crystal oscillator to provide precise reference clock, which results in additional costs and spaces. In order to save costs and spaces, the manufacturer integrates an oscillator into a system chip to realize a crystal-less design. However, in a conventional crystal-less USB system, a crystal oscillator integrated in to a system chip cannot provide a precise reference clock due to temperature and process variations. This results in system performance degradation.

Thus, there is a need for a novel clock correction method to correct an output clock of a crystal oscillator integrated into a system chip.

SUMMARY OF THE INVENTION

It is therefore one objective of the present invention to provide a clock correction method utilizing a training sequence used for communication link training to correct a frequency of an output clock of an oscillator, and a related clock correction circuit to solve the above-mentioned problems.

It is another objective of the present invention to provide a method for generating a reference clock, which utilizes a training sequence used for communication link training to generate an output clock, and a related circuit for generating a reference clock to output a reference clock unaffected by temperature and process variations.

According to an embodiment of the present invention, an exemplary clock correction method is disclosed. The exemplary clock correction method comprises the following steps: receiving an equalization training sequence (TSEQ) specified by a communication protocol, wherein the equalization training sequence comprises a specific pattern occurring repeatedly; performing frequency division on the equalization training sequence according to a number of toggles of the specific pattern so as to generate an equalization training sequence clock; and correcting a frequency of an output clock of an oscillator according to the equalization training sequence clock.

According to an embodiment of the present invention, an exemplary method for generating a reference clock is disclosed. The exemplary method for generating the reference clock comprises the following steps: utilizing an oscillator to generate an output clock; receiving an equalization training sequence specified by a communication protocol, wherein the equalization training sequence comprises a specific pattern occurring repeatedly; performing frequency division on the equalization training sequence according to a number of toggles of the specific pattern so as to generate an equalization training sequence clock; and correcting a frequency of the output clock of the oscillator according to the equalization training sequence clock, and using the corrected output clock as the reference clock.

According to an embodiment of the present invention, an exemplary clock correction circuit is disclosed. The exemplary clock correction circuit is arranged for correcting an output clock of an oscillator. The clock correction circuit comprises a frequency division circuit and a frequency correction circuit. The frequency division circuit is arranged for receiving an equalization training sequence specified by a communication protocol, wherein the equalization training sequence comprises a specific pattern occurring repeatedly, and the frequency division circuit further performs frequency division on the equalization training sequence according to a number of toggles of the specific pattern so as to generate an equalization training sequence clock. The frequency correction circuit is coupled to the frequency division circuit, and is arranged for correcting a frequency of the output clock of the oscillator according to the equalization training sequence clock.

According to an embodiment of the present invention, an exemplary circuit for generating a reference clock is disclosed. The exemplary circuit for generating the reference clock comprises an oscillator, a frequency division circuit and a frequency correction circuit. The oscillator is arranged for generating an output clock. The frequency division circuit is arranged for receiving an equalization training sequence specified by a communication protocol, wherein the equalization training sequence comprises a specific pattern occurring repeatedly, and the frequency division circuit further performs frequency division on the equalization training sequence according to a number of toggles of the specific pattern so as to generate an equalization training sequence clock. The frequency correction circuit is coupled to the oscillator and the frequency divider circuit, and is arranged for correcting a frequency of the output clock of the oscillator according to the equalization training sequence clock. The oscillator uses the corrected output clock as the reference clock.

By utilizing periodic properties of an equalization training sequence to correct an output clock of an oscillator, the proposed clock correction mechanism/reference clock generation mechanism may reduce/eliminate effects caused by chip temperature and process variations with almost no additional circuit area and manufacturing cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
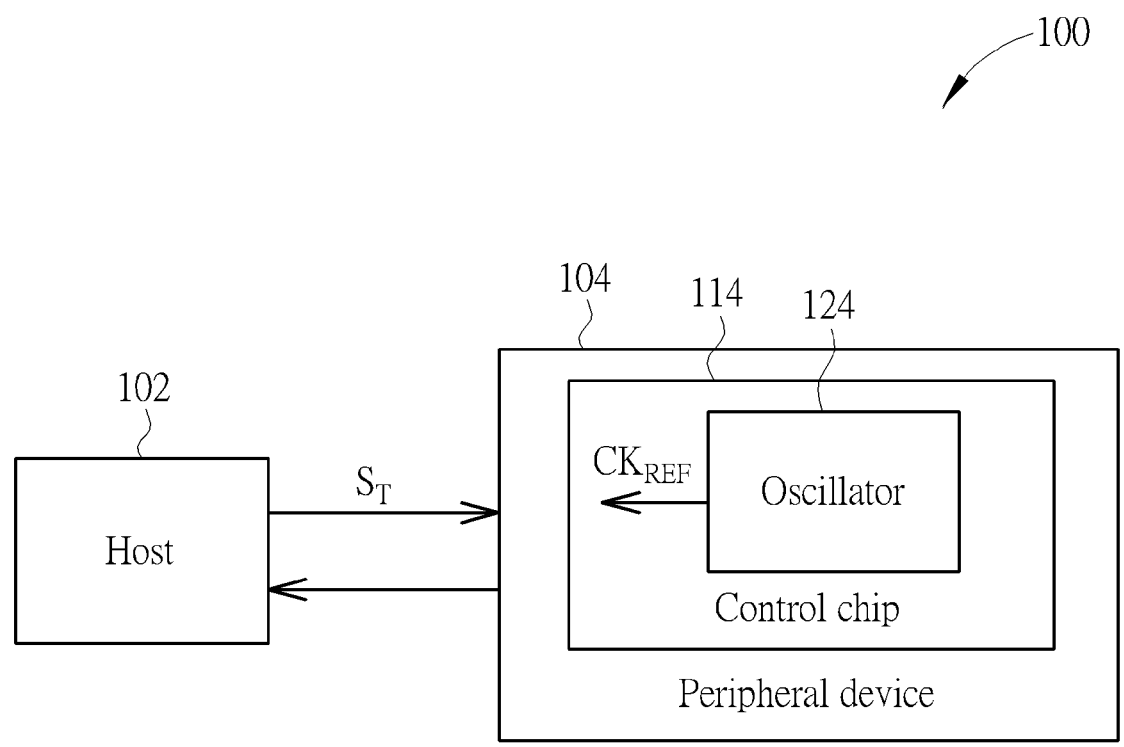
FIG. 1 is a diagram illustrating an exemplary data transmission system according to an embodiment of the present invention.

FIG. 1 is a diagram illustrating an exemplary data transmission system according to an embodiment of the present invention. The data transmission system 100 may include a host (e.g. a personal computer) 102 and a peripheral device 104, wherein the host 102 and the peripheral device 104 perform data transmission and communicate with each other according to a communication protocol. By way of example but not limitation, the communication protocol may include a universal serial bus (USB) protocol (e.g. USB 3.0 protocol), and the peripheral device 104 may be implemented by an electronic apparatus having USB port(s).

In this embodiment, the peripheral device 104 may include a control chip 114, which may include an oscillator (e.g. a digital-controlled oscillator (DCO)) 124 integrated therein. The oscillator 124 may generate a reference clock $CK_{REF}$ to be used as a reference clock for data transmission and reception between the host 102 and the peripheral device 104. In order to reduce/eliminate effects of temperature and process variations on the reference clock $CK_{REF}$, when the host 102 performs link training (e.g. polling) with the peripheral device 104, the peripheral device 104 may correct a frequency of the reference clock $CK_{REF}$ according to a repeated signal pattern of a training signal $S_T$ (an equalization training sequence (equalization TSEQ)) transmitted from the host 102. Further description is provided below.

Figure 2:
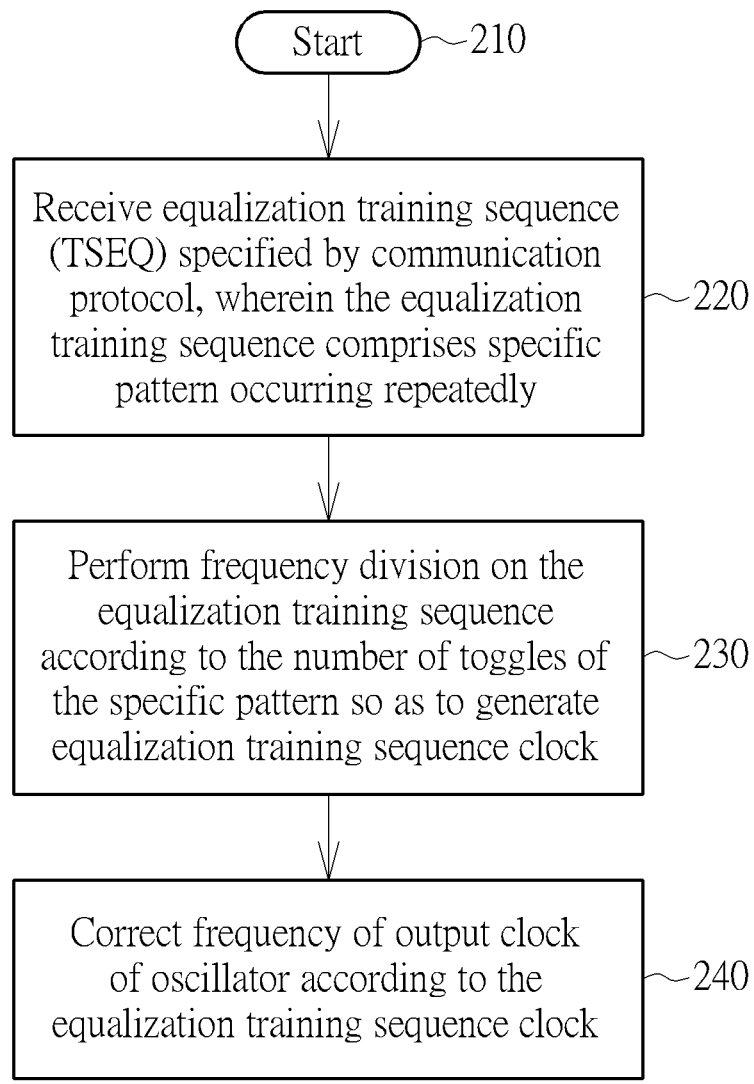
FIG. 2 is a flowchart of an exemplary clock correction method according to an embodiment of the present invention.

Please refer to FIG. 2 in conjunction with FIG. 1. FIG. 2 is a flow chart of an exemplary clock correction method according to an embodiment of the present invention. Provided that the result is substantially the same, the steps are not required to be executed in the exact order shown in FIG. 2. For example, the steps shown in FIG. 2 need not to be contiguous. Other steps can be intermediate. It should be noted that the clock correction method shown in FIG. 2 may be employed in the peripheral device 104 shown in FIG. 1. Hence, the clock correction method shown in FIG. 2 is described with reference to the data transmission system 100 shown in FIG. 1 for illustrative purposes. However, this is not meant to be a limitation of the present invention.

In step 210, link training or polling is performed between the host 102 and the peripheral device 104. In step 220, the peripheral device 104 (or the control chip 114) may receive an equalization training sequence transmitted from the host 102 (e.g. the training signal $S_T$), wherein the equalization training sequence may include a specific pattern occurring repeatedly. For example, in a case where the host 102 and the peripheral device 104 perform data transmission and communicate with each other according to a USB protocol (e.g. USB 3.0 protocol), the host 102 may transmit an equalization training sequence pattern $TS_{HP}$ shown in FIG. 3 repeatedly for a predetermined period of time during the link training. In other words, the peripheral device 104 may receive the equalization training sequence pattern $TS_{HP}$ shown in FIG. 3 (i.e. the specific pattern) repeatedly for the predetermined period of time. As the equalization training sequence received by the peripheral device 104 (e.g. the training signal $S_T$) is transmitted from the host 102 and is not affected by temperature and process variations within the peripheral device 104 (or the control chip 114), the peripheral device 104 (or the control chip 114) may obtain a reference frequency according to periodic properties of the equalization training sequence (e.g. the specific pattern occurring repeatedly), and accordingly correct the reference clock $CK_{REF}$ generated by the oscillator 124 (steps 230 and 240).

For example, in step 230, the peripheral device 104 may perform frequency division on the equalization training sequence (e.g. the training signal $S_T$) according to a number of toggles of the specific pattern (i.e. the number of bit pattern changes from one of "0" and "1" to the other of "0" and "1") so as to generate an equalization training sequence clock (not shown in FIG. 1).

Figure 3:
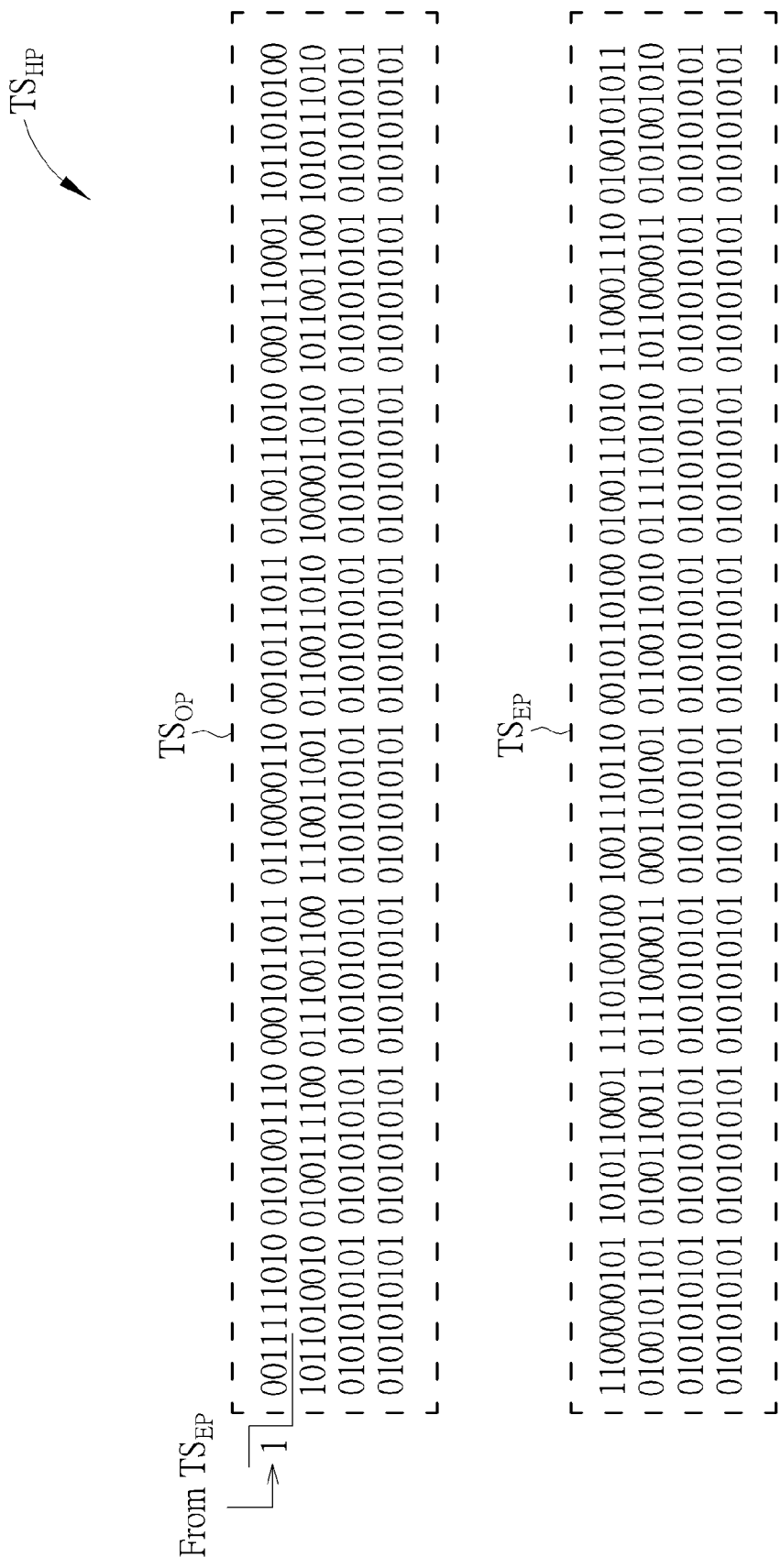
FIG. 3 is a diagram illustrating an exemplary equalization training sequence pattern according to an embodiment of the present invention.
Figure 4:
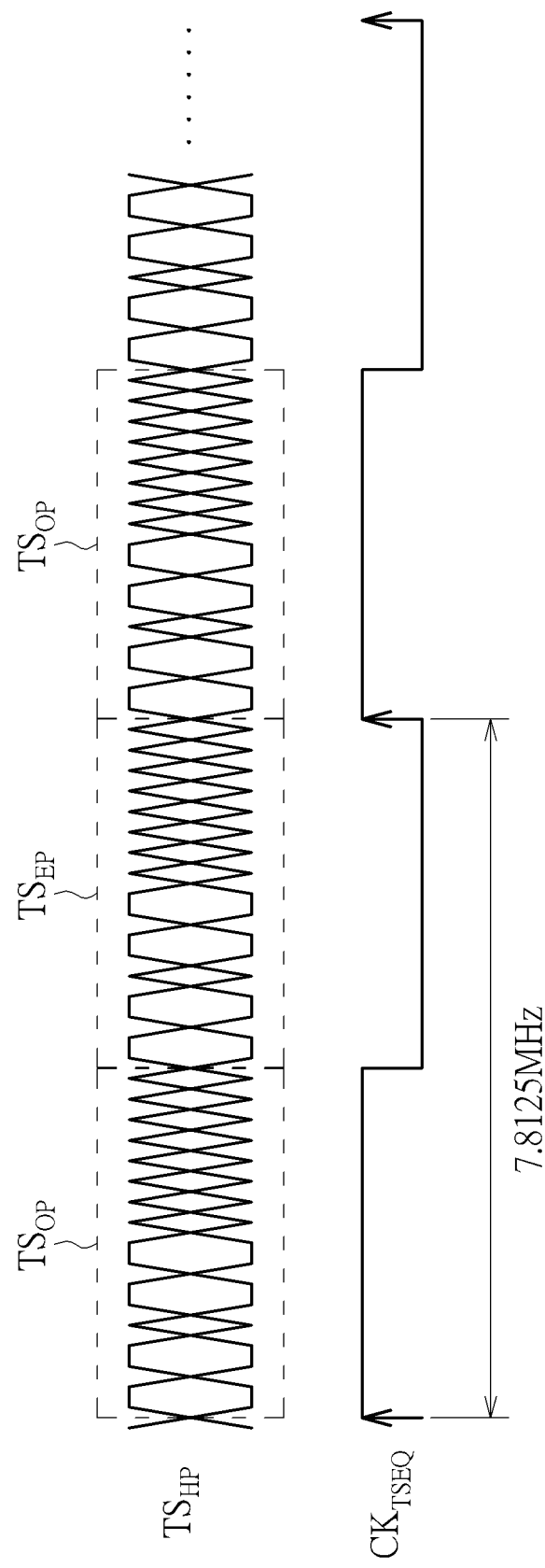
FIG. 4 is a diagram illustrating generation of an exemplary equalization training sequence clock according to an embodiment of the present invention.

In the embodiment shown in FIG. 3, the equalization training sequence pattern $TS_{HP}$ may include an odd pattern $TS_{OP}$ and an even pattern $TS_{EP}$, which means that the training signal $S_T$ transmitted from the host 102 carries the odd pattern $TS_{OP}$ and the even pattern $TS_{EP}$ occurring alternately (as shown in FIG. 4). In other words, the odd pattern $TS_{OP}$ and the even pattern $TS_{EP}$ may alternately occur in the equalization training sequence received by the peripheral device 104. Hence, the peripheral device 104 may obtain the number of toggles of the equalization training sequence pattern $TS_{HP}$ by analyzing the number of toggles of the odd pattern $TS_{OP}$ and the number of toggles of the even pattern $TS_{EP}$. It should be noted that, although a waveform of the equalization training sequence shown in FIG. 4 corresponds to the equalization training sequence $TS_{HP}$ shown in FIG. 3, the waveform shown in FIG. 4 is not depicted exactly based on the equalization training sequence $TS_{HP}$ shown in FIG. 3 for the sake of brevity.

In FIG. 3, the number of toggles of the odd pattern $TS_{OP}$ of the equalization training sequence pattern $TS_{HP}$ equals to 250, and the number of toggles of the even pattern $TS_{EP}$ of the equalization training sequence pattern $TS_{HP}$ equals to 254. In other words, the number of toggles of the equalization training sequence pattern $TS_{HP}$ equals to 504, and a cycle period of the specific pattern received by the peripheral device 104 (the equalization training sequence pattern $TS_{HP}$) may be represented by 504 toggles. The peripheral device 104 may perform the frequency division on the training signal $S_T$ according to 504 toggles. For example, as two toggles may correspond to one clock cycle, the peripheral device 104 may use one half of the number of toggles of the equalization training sequence pattern $TS_{HP}$ (i.e. 252) as a divisor used by the frequency division to thereby generate an equalization training sequence clock $CK_{TSEQ}$ shown in FIG. 4.

As an equalization training sequence clock generated according to periodic properties of the equalization training sequence (e.g. the equalization training sequence clock $CK_{TSEQ}$ shown in FIG. 4) is not affected by the temperature and process variations within the peripheral device 104, the peripheral device 104 (or the control chip 114) may correct a frequency of an output clock of the oscillator 124 (not shown in FIG. 1) according to the generated equalization training sequence clock (e.g. the equalization training sequence clock $CK_{TSEQ}$ shown in FIG. 4) (step 240). By way of example but not limitation, the peripheral device 104 (or the control chip 114) may compare a frequency of the equalization training sequence clock (e.g. the equalization training sequence clock $CK_{TSEQ}$ shown in FIG. 4), generated after the frequency division, with the frequency of the output clock to generate a comparison result, and correct the frequency of the output clock according to the comparison result.

After the clock correction is completed, the oscillator 124 may output the corrected output clock as the reference clock $CK_{REF}$. In other words, the output clock outputted from the oscillator 124 may be a clock signal which has not been corrected to the reference clock $CK_{REF}$. In an alternative design, after the clock correction is completed, the oscillator 124 may refer to the corrected output clock to generate a clock signal different from the output clock as the reference clock $CK_{REF}$. In brief, as long as the peripheral device 104 may generate the reference clock $CK_{REF}$ according to the corrected output clock, other variations, modifications and alternatives fall within the spirit and scope of the present invention.

In one implementation, when the host 102 transmits an equalization training sequence (the training signal $S_T$) having the equalization training sequence pattern $TS_{HP}$ shown in FIG. 3 according to USB 3.0 protocol, the frequency of the reference clock $CK_{REF}$ of the oscillator 124 may be specified to 5 gigahertz (GHz), and the frequency of the equalization training sequence clock $CK_{TSEQ}$ may be 7.8215 megahertz (MHz). Hence, the peripheral device 104 (or the control chip 114) may correct the frequency of the output clock of the oscillator 124 to a target frequency (5 GHz) or a frequency within a predetermined range around a target frequency according to the equalization training sequence clock $CK_{TSEQ}$. It should be noted that, in this implementation, the frequency of the reference clock $CK_{REF}$ is an integral multiple of the frequency of the equalization training sequence clock $CK_{TSEQ}$, which simplifies circuit design for clock correction in the peripheral device 104 (or the control chip 114) and increases accuracy of clock correction.

The above is for illustrative purposes only and is not meant to be a limitation of the present invention. In one implementation, the divisor (or divisor factor) used for the frequency division performed in step 230 is not limited to one half of the number of toggles of the equalization training sequence pattern $TS_{HP}$. It is possible to use an integral multiple of one half of the number of toggles of the equalization training sequence pattern $TS_{HP}$ as the divisor used by the frequency division. In another implementation, the specific pattern of the equalization training sequence received by the peripheral device 104 is not limited to the equalization training sequence pattern $TS_{HP}$. As long as the equalization training sequence received by the peripheral device 104 may include a sequence pattern occurring repeatedly, it is possible to employ the clock correction method shown in FIG. 2 to correct the output clock of the oscillator 124. In yet another implementation, as long as a frequency of an output clock of an oscillator may be corrected according to an equalization training sequence clock which is generated after frequency division, other signal processing operations rather than frequency comparison may be performed in step 240. For example, the peripheral device 104 (or the control chip 114) may perform signal correlation on the equalization training sequence clock and the output clock to thereby correct the frequency of the output clock.

Figure 5:
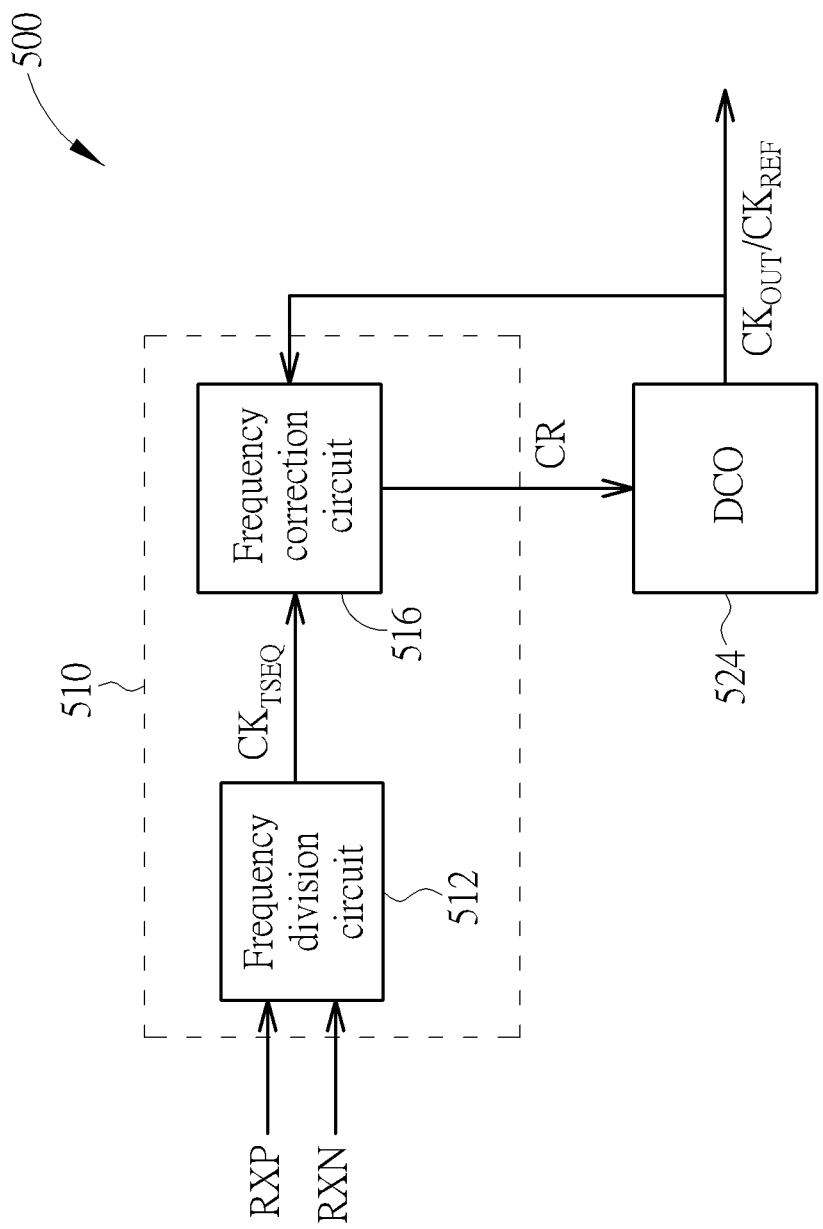
FIG. 5 is a block diagram illustrating an exemplary reference clock generation circuit according to an embodiment of the present invention.
Figure 6:
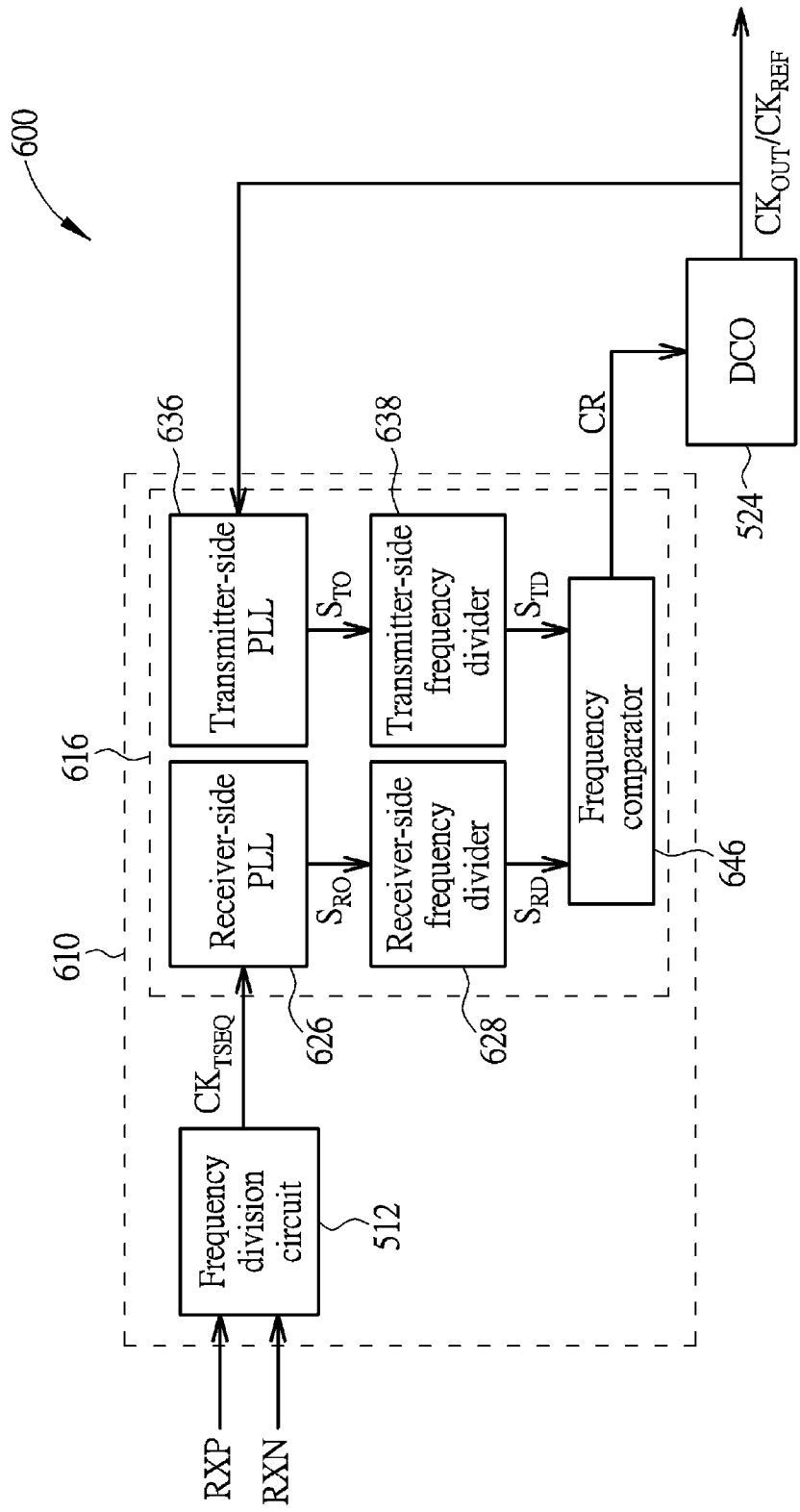
FIG. 6 is an implementation of the reference clock generation circuit shown in FIG. 5.

For a better understanding of the present invention, a plurality of exemplary reference clock generation circuits shown in FIG. 5 and FIG. 6 are given below to describe the proposed reference clock generation mechanism, wherein each of the exemplary reference clock generation circuits shown in FIG. 5 and FIG. 6 may employ the clock correction method shown in FIG. 2 to correct a generated reference clock. Please note that this is for illustrative purposes only. Circuits which employ the clock correction method shown in FIG. 2 to correct/generate reference clocks are not limited to the reference clock generation circuits shown in FIG. 5 and FIG. 6.

Please refer to FIG. 5 in conjunction with FIG. 1. FIG. 5 is a block diagram illustrating an exemplary reference clock generation circuit according to an embodiment of the present invention. The reference clock generation circuit 500 may include, but is not limited to, a clock correction circuit 510 and a digitally-controlled oscillator (DCO) 524, wherein the reference clock generation circuit 500 may be implemented within the peripheral device 104 or the control chip 114 shown in FIG. 1, and the oscillator 124 shown in FIG. 1 may be implemented by the DCO 524. The clock correction circuit 510 may employ the clock correction method shown in FIG. 2 to correct an output clock $CK_{OUT}$ of the DCO 524.

The clock correction circuit 510 may include, but is not limited to, a frequency division circuit 512 and a frequency correction circuit 516. The frequency division circuit 512 may receive an equalization training sequence specified by a communication protocol (e.g. USB 3.0 protocol), wherein the equalization training sequence comprises a specific pattern occurring repeatedly. For example, the frequency division circuit 512 may receive a set of input signals RXP and RXN (i.e. the training signal $S_T$ shown in FIG. 1), wherein an equalization training sequence pattern, occurring repeatedly and carried by the set of input signals RXP and RXN, may be implemented by the equalization training sequence pattern $TS_{HP}$, shown in FIG. 3.

Next, the frequency division circuit 512 may perform frequency division on the equalization training sequence (the set of input signals RXP and RXN) according to a number of toggles of the equalization training sequence pattern $TS_{HP}$, shown in FIG. 3 so as to generate an equalization training sequence clock. For example, the frequency division circuit 512 may use one half of the number of toggles of the equalization training sequence pattern $TS_{HP}$ (i.e. 252) as a divisor used by the frequency division. Hence, the frequency division circuit 512 may output the equalization training sequence clock $CK_{TSEQ}$ shown in FIG. 4 (having a frequency of 7.8125 MHz). In an alternative design, the frequency division circuit 512 may use a multiple of one half of the number of toggles as the divisor used by the frequency division.

The frequency correction circuit 516 is coupled to the DCO 524 and the frequency division circuit 512, and is arranged for receiving the equalization training sequence clock $CK_{TSEQ}$ and accordingly correcting the frequency of the output clock $CK_{OUT}$. For example, the frequency correction circuit 516 may further receive the output clock $CK_{OUT}$ outputted from the DCO 524, compare the frequency of the equalization training sequence clock $CK_{TSEQ}$ with the frequency of the output clock $CK_{OUT}$ to generate a comparison result, and correct the frequency of the output clock $CK_{OUT}$ of the DCO 524 according to the comparison result. In another example, the frequency correction circuit 516 may perform signal correlation on the equalization training sequence clock $CK_{TSEQ}$ and the output clock $CK_{OUT}$ to thereby correct the frequency of the output clock $CK_{OUT}$. Additionally, after the clock correction circuit 510 completes the frequency correction, the DCO 524 may output the corrected output clock $CK_{OUT}$ as a reference clock (e.g. the reference clock $CK_{REF}$ shown in FIG. 1).

As shown in FIG. 5, the reference clock generation circuit 500 may utilize a simple circuit structure to correct the output clock $CK_{OUT}$ of the DCO 524 based on periodic properties of the equalization training sequence unaffected by the chip fabrication process. In other words, the proposed clock correction mechanism may accurately correct an output clock of an oscillator integrated in a system chip with almost no additional circuit area and manufacturing cost.

In addition to directly correcting a frequency of an oscillator according to an extracted equalization training sequence clock, the proposed clock correction mechanism may utilize the equalization training sequence clock to correct a receiver-side frequency first and then a transmitter-side frequency. Please refer to FIG. 6, which is an implementation of the reference clock generation circuit 500 shown in FIG. 5. The reference clock generation circuit 600 may include, but is not limited to, the DCO 524 shown in FIG. 5 and a clock correction circuit 610, wherein the correction circuit 610 may include the frequency division circuit 512 shown in FIG. 5 and a frequency correction circuit 616. In this implementation, the frequency correction circuit 616 may include a receiver-side phase-locked loop (PLL) 626, a receiver-side frequency divider 628, a transmitter-side PLL 636, a transmitter-side frequency divider 638 and a frequency comparator 646.

The receiver-side PLL 626 is coupled to the frequency division circuit 512, and is arranged for providing an oscillation signal $S_{RO}$, and correcting the oscillation signal $S_{RO}$ according to the equalization training sequence clock $CK_{TSEQ}$. The receiver-side frequency divider 628 is coupled to the receiver-side PLL 626, and is arranged for dividing a frequency of the oscillation signal $S_{RO}$ to generate a frequency-divided signal $S_{RD}$. The transmitter-side PLL 636 is coupled to the DCO 524, and is arranged for receiving the output clock $CK_{OUT}$ to generate an oscillation signal $S_{TO}$. The transmitter-side frequency divider 638 is coupled to the transmitter-side PLL 636, and is arranged for dividing a frequency of the oscillation signal $S_{TO}$ to generate a frequency-divided signal $S_{TD}$.

The frequency comparator 646 is coupled to the receiver-side frequency divider 628, the transmitter-side frequency divider 638 and the DCO 524, and is arranged for comparing a frequency of the frequency-divided signal $S_{RD}$ with a frequency of the frequency-divided signal $S_{TD}$ to generate a comparison result CR, and correcting the frequency of the output clock $CK_{OUT}$ of the oscillator according to the comparison result CR. In other words, the proposed clock correction mechanism may use the extracted equalization training sequence clock $CK_{TSEQ}$ to correct a receiver-side frequency (the frequency of the frequency-divided signal $S_{RD}$) first, and then compare the receiver-side frequency with a transmitter-side frequency (the frequency of the frequency-divided signal $S_{TD}$) (e.g. by means of the frequency comparator 646), thereby correcting the frequency of the output clock $CK_{OUT}$ of the DCO 524.

Please note that the above is for illustrative purposes only and is not meant to be a limitation of the present invention. For example, the training signal received by the frequency division circuit 512 shown in FIG. 5/FIG. 6 is not limited to the set of input signals RXP and RXN (e.g. a pair of differential signals); it is possible to use other types of input signals. In another example, the receiver-side frequency divider 628 and the transmitter-side frequency divider 638 are optional as long as the frequency comparator 646 may compare the receiver-side frequency with the transmitter-side frequency.

To sum up, by utilizing periodic properties of an equalization training sequence to correct an output clock of an oscillator, the proposed clock correction mechanism/reference clock generation mechanism may reduce/eliminate effects caused by chip temperature and process variations with almost no additional circuit area and manufacturing cost. Additionally, the proposed clock correction mechanism/reference clock generation mechanism is not limited to being applied to a USB 3.0 system. As long as the number of toggles of a signal, having a pattern occurring repeatedly, in a communication protocol can be analyzed, and a suitable divisor used for frequency division can be obtained, associated systems may utilize the proposed clock correction mechanism/reference clock generation mechanism to generate a reference clock with an accurate frequency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clock correction method, comprising:
   receiving an equalization training sequence (TSEQ) specified by a communication protocol, wherein the equalization training sequence comprises a specific pattern occurring repeatedly;
   performing frequency division on the equalization training sequence according to a number of toggles of the specific pattern so as to generate an equalization training sequence clock; and
   correcting a frequency of an output clock of an oscillator according to the equalization training sequence clock.

2. The clock correction method of claim 1, wherein the step of performing the frequency division on the equalization training sequence according to the number of toggles of the specific pattern so as to generate the equalization training sequence clock comprises:
   using one half of the number of toggles of the specific pattern as a divisor used by the frequency division.

3. The clock correction method of claim 1, wherein the step of correcting the frequency of the output clock of the oscillator according to the equalization training sequence clock comprises:
   comparing a frequency of the equalization training sequence clock with the frequency of the output clock to generate a comparison result; and
   correcting the frequency of the output clock of the oscillator according to the comparison result.

4. The clock correction method of claim 1, wherein the communication protocol is a universal serial bus protocol.

5. A method for generating a reference clock, comprising:
   utilizing an oscillator to generate an output clock;
   receiving an equalization training sequence specified by a communication protocol, wherein the equalization training sequence comprises a specific pattern occurring repeatedly;
   performing frequency division on the equalization training sequence according to a number of toggles of the specific pattern so as to generate an equalization training sequence clock; and
   correcting a frequency of the output clock of the oscillator according to the equalization training sequence clock, and using the corrected output clock as the reference clock.

6. A clock correction circuit, the clock correction circuit arranged for correcting an output clock of an oscillator, the clock correction circuit comprising:
   a frequency division circuit, for receiving an equalization training sequence specified by a communication protocol, wherein the equalization training sequence comprises a specific pattern occurring repeatedly, and the frequency division circuit further performs frequency division on the equalization training sequence according to a number of toggles of the specific pattern so as to generate an equalization training sequence clock; and a frequency correction circuit, coupled to the frequency division circuit, the frequency correction circuit arranged for correcting a frequency of the output clock of the oscillator according to the equalization training sequence clock.

7. The clock correction circuit of claim 6, wherein the frequency division circuit uses one half of the number of toggles of the specific pattern as a divisor used by the frequency division.

8. The clock correction circuit of claim 6, wherein the frequency correction circuit compares a frequency of the equalization training sequence clock with the frequency of the output clock to generate a comparison result, and corrects the frequency of the output clock of the oscillator according to the comparison result.

9. The clock correction circuit of claim 6, wherein the frequency correction circuit comprises:
a receiver-side phase-locked loop, coupled to the frequency division circuit, the receiver-side phase-locked loop arranged for providing a first oscillation signal, and correcting the first oscillation signal according to the equalization training sequence clock;
a receiver-side frequency divider, coupled to the receiver-side phase-locked loop, the receiver-side frequency divider arranged for dividing a frequency of the first oscillation signal to generate a first frequency-divided signal;
a transmitter-side phase-locked loop, for receiving the output clock of the oscillator to generate a second oscillation signal;
a transmitter-side frequency divider, coupled to the transmitter-side phase-locked loop, the transmitter-side frequency divider arranged for dividing a frequency of the second oscillation signal to generate a second frequency-divided signal; and
a frequency comparator, coupled to the receiver-side frequency divider and the transmitter-side frequency divider, the frequency comparator arranged for comparing a frequency of the first frequency-divided signal with a frequency of the second frequency-divided signal to generate a comparison result, and correcting the frequency of the output clock of the oscillator according to the comparison result.

10. The clock correction circuit of claim 6, wherein the communication protocol is a universal serial bus protocol.

11. A circuit for generating a reference clock, comprising:
an oscillator, for generating an output clock;
a frequency division circuit, for receiving an equalization training sequence specified by a communication protocol, wherein the equalization training sequence comprises a specific pattern occurring repeatedly, and the frequency division circuit further performs frequency division on the equalization training sequence according to a number of toggles of the specific pattern so as to generate an equalization training sequence clock; and
a frequency correction circuit, coupled to the oscillator and the frequency divider circuit, the frequency correction circuit arranged for correcting a frequency of the output clock of the oscillator according to the equalization training sequence clock;
wherein the oscillator uses the corrected output clock as the reference clock.

* * * * *